United States Patent [19]
Chou

[11] Patent Number: 6,039,478
[45] Date of Patent: Mar. 21, 2000

[54] ERGONOMICAL KEYBOARD ASSEMBLY

[75] Inventor: Chin-Wen Chou, Taipei Hsien, Taiwan

[73] Assignee: Shin Jiuh Corp., Taiwan

[21] Appl. No.: 09/293,058

[22] Filed: Apr. 16, 1999

[51] Int. Cl.[7] ....................................................... B41J 5/08
[52] U.S. Cl. ............................................ 400/472; 341/22
[58] Field of Search .................................... 400/472, 480, 400/691, 693; 341/22, 21; 361/680

[56] References Cited

U.S. PATENT DOCUMENTS

| | | | |
|---|---|---|---|
| 4,509,873 | 4/1985 | Ryan | 400/489 |
| 4,948,228 | 8/1990 | Werner | 400/472 |
| 5,067,834 | 11/1991 | Szmanda et al. | 400/489 |

*Primary Examiner*—John S. Hilten
*Assistant Examiner*—Darius N. Cone
*Attorney, Agent, or Firm*—Nixon & Vanderhye

[57] ABSTRACT

An ergonomical keyboard assembly includes an upper cover, a lower base plate connected to the cover, and a unitary keyboard. The upper cover includes a hollow frame that confines an opening. The keyboard has a substrate mounted on the base plate below the cover, and a plurality of keys which are mounted on the substrate and which have key caps projecting upward and outward from the cover through the opening. The substrate has a top face which is arched and which protrudes upward. The key caps form an arched overall key surface that projects upward and outward through the opening and that is arched from two ends to an intermediate portion of the opening.

5 Claims, 6 Drawing Sheets

ERGONOMICAL KEYBOARD ASSEMBLY

BACKGROUND OF THE INVENTION

1. Field of the Invention

The invention relates to a keyboard assembly, more particularly to an ergonomical keyboard assembly.

2. Description of the Related Art

Referring to FIG. 1, a conventional keyboard assembly includes a plurality of keys which are arranged on a same plane, and an overall key surface formed on top of the keys is planar. When operating the keys of such an assembly, the user must place his/her hands in a working position in which palms and fingers lie on a substantially horizontal plane. In order to reach this working position, the user must turn or twist outward his/her elbows and wrists from their natural physical positions, and the palms, which normally face inward and towards one another and which are normally in a non-stretched convex state, have to turn to a downward facing position. Therefore, the aforesaid keyboard assembly is not ergonomically favorable to the user, and the user would easily become tired or even get hurt, especially, at his/her shoulders, elbows, and wrists, after working for a long period in an unnatural physical position.

There is another conventional keyboard assembly in which operating keys are divided into two groups (a, b) arranged in inclined positions in two separate areas, as shown in FIGS. 2 and 3, and in which an arched palm rest portion (c) is provided to support the hands of the user. This assembly permits the user to place his/her hands comfortably on the arched palm rest portion (c) in a natural physical position, without turning or twisting his/her elbows and wrists. However, since the key groups (a, b) are fabricated and are assembled separately, the manufacturing process of this keyboard assembly requires extra components and steps, thereby increasing the cost of production. On the other hand, as the overall key surface of each key group (a or b) is still planar and not arched, all of the keys must be hit in directions perpendicular to the planar key surface. As the hands have the fingers and palms thereof normally bending inward and as the fingers in their bending positions would have to move forward along directions perpendicular to an arched surface, this keyboard assembly is insufficient to satisfy the requirements for proper human operation and performance.

SUMMARY OF THE INVENTION

Therefore, the main object of the present invention is to provide an ergonomical keyboard assembly that permits a user to operate keys comfortably without requiring his/her hands, elbows, and wrists to make positional changes from their original and natural physical positions.

According to this invention, an ergonomical keyboard assembly includes an upper cover, a lower base plate connected to the cover, and a keyboard. The upper cover includes a hollow frame and an opening confined by the frame. The opening has two opposite ends and an intermediate portion. The keyboard has a substrate mounted on the base plate below the cover, and a plurality of keys which are mounted on the substrate and which have key caps projecting upward and outward from the cover through the opening. The substrate has a top face which is arched and which protrudes upward. The key caps form an arched overall key surface that projects upward and outward through the opening and that is arched upward from the two ends to the intermediate portion of the opening.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
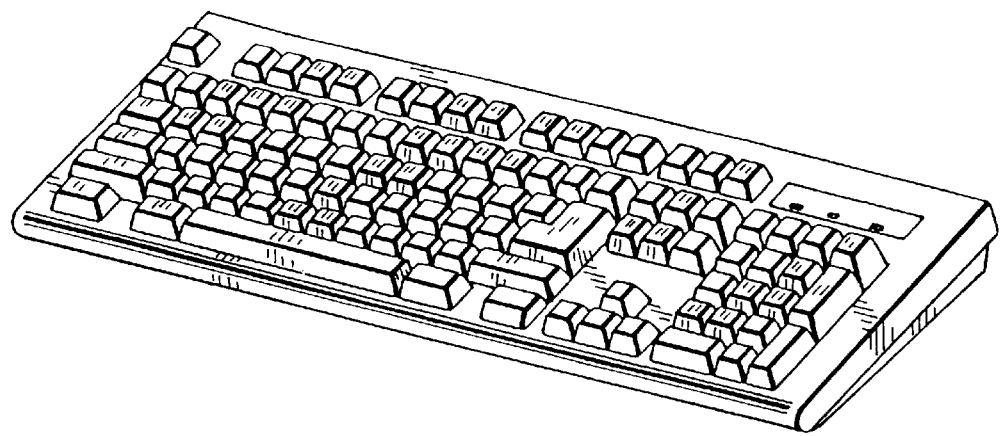
FIG. 1 is a perspective view of a conventional keyboard assembly.
Figure 2:
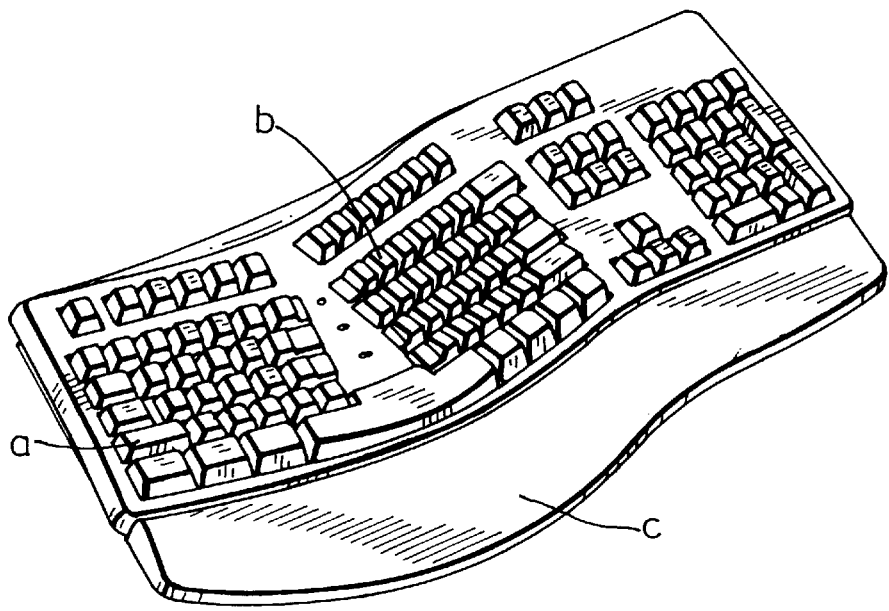
FIG. 2 is a perspective view of another conventional keyboard assembly.
Figure 3:
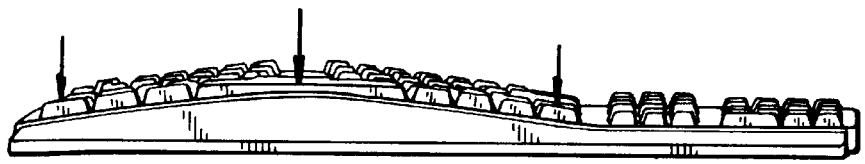
FIG. 3 is a side view of the keyboard assembly of FIG. 2.

Before the present invention is described in greater detail, it should be noted that like elements are denoted by the same reference numerals throughout the disclosure.

Figure 4:
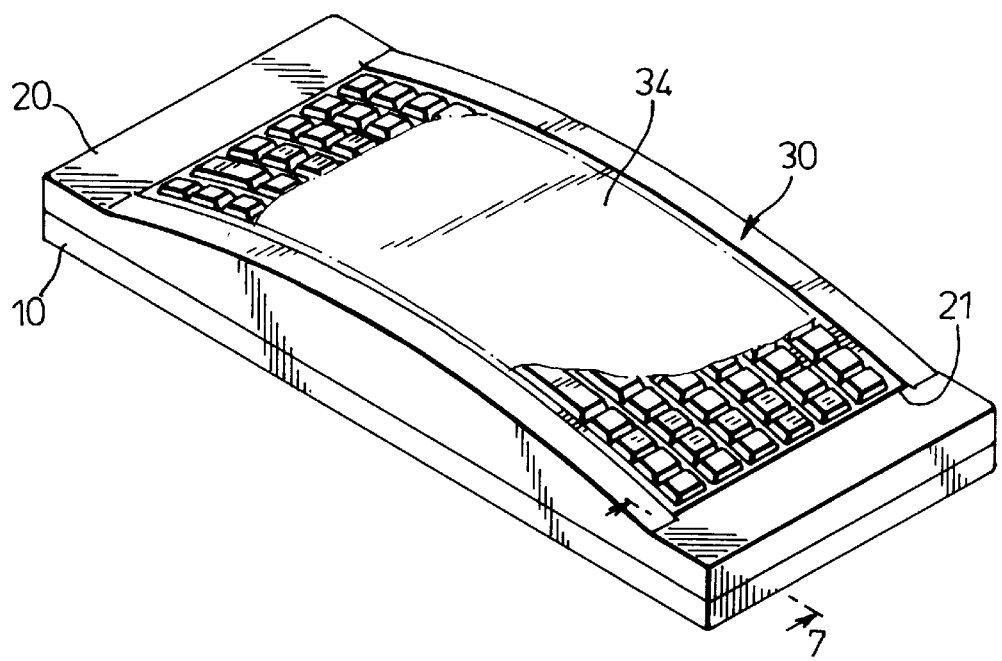
FIG. 4 is a perspective view showing the first preferred embodiment of an ergonomical keyboard assembly according to this invention.
Figure 5:
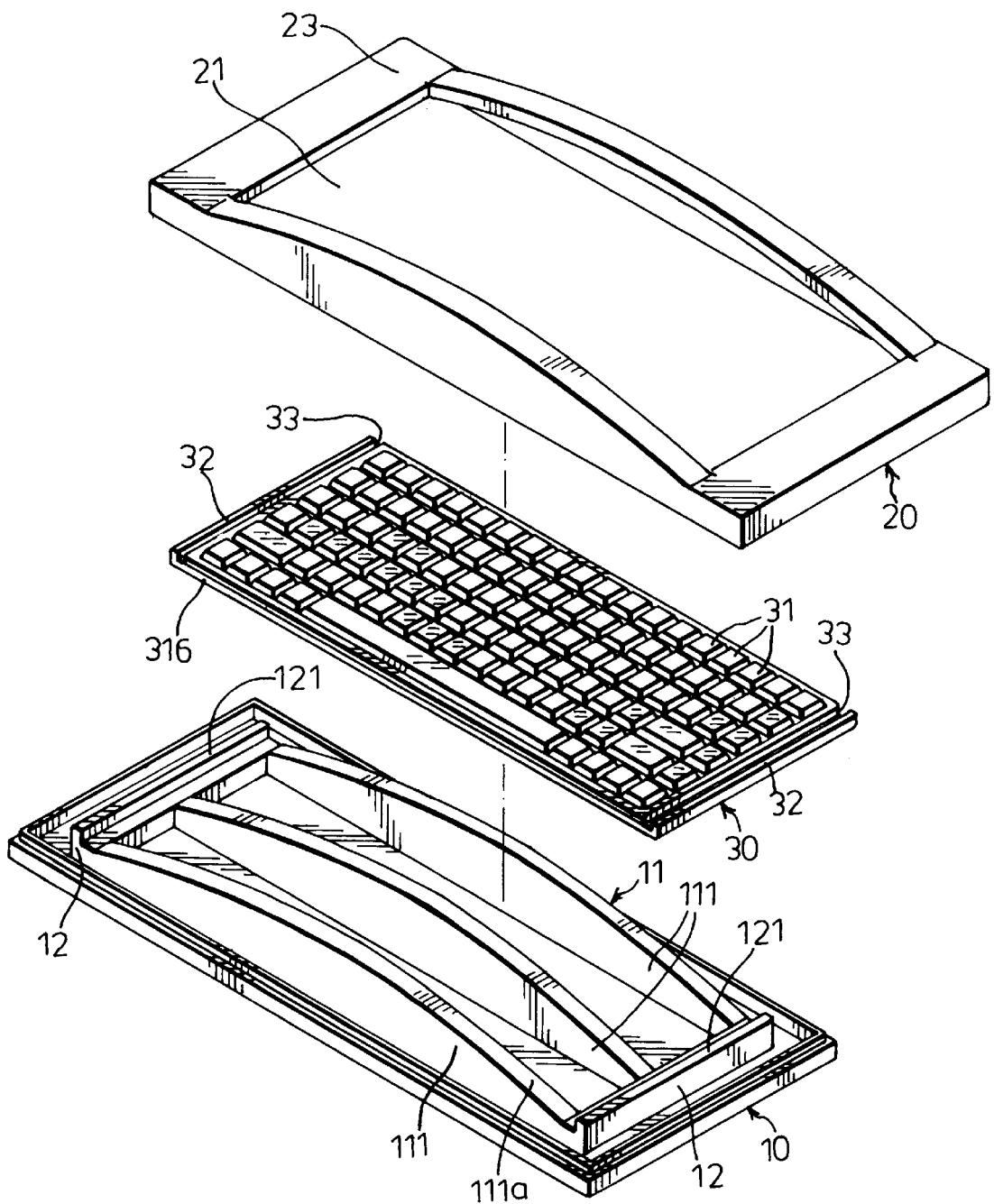
FIG. 5 is an exploded perspective view showing the first preferred embodiment.
Figure 6:
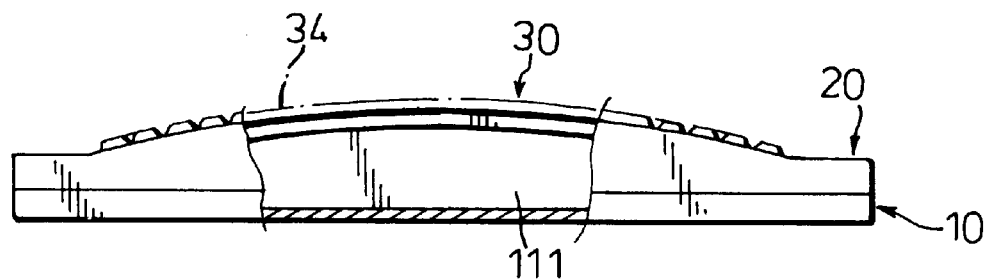
FIG. 6 is a partially sectioned view of the embodiment of FIG. 4.

Referring to FIGS. 4, 5 and 6, according to the first preferred embodiment of this invention, an ergonomical keyboard assembly is shown to include an upper cover 20, a lower base plate 10 connected to the cover 20, and a unitary keyboard 30.

The cover 20 includes a hollow frame 23. An opening 21 is confined by the frame 23.

The keyboard 30 has a substrate 316 mounted on the base plate 10 below the cover 20. A plurality of keys 31 are mounted on the substrate 316 and have key caps 311 projecting upward and outward from the cover 20 through the opening 21. The substrate 316 is flexible and flat before mounting on the base plate 10.

The base plate 10 includes a support 11 to hold the substrate 316. The support 11 includes a plurality of support strips 111 which extend lengthwise on and which project upward from the base plate 10. The support strips 111 have arched top ends 111a. When the substrate 316 is placed on the support strips 111, the substrate 316 forms an arched top face that protrudes upward. The key caps 311 form an arched overall key surface 34 that projects upward and outward through the opening 21. The arched overall key surface 34 is arched upward from two ends to an intermediate portion of the opening 21, and is symmetrical at two sides of the intermediate portion of the opening 21.

The base plate 10 further includes engaging means that includes a pair of engaging strips 12 which extend lengthwise and which project upward from the base plate 10. The engaging strips 12 extend transversely of the support strips 111 and are connected to two opposite ends of each support strip 111. The engaging strips 12 have upwardly projecting stop flanges 121 to press the opposing ends 32 of the substrate 316 in two opposing directions toward one another, thereby flexing the substrate 316.

Figure 7:
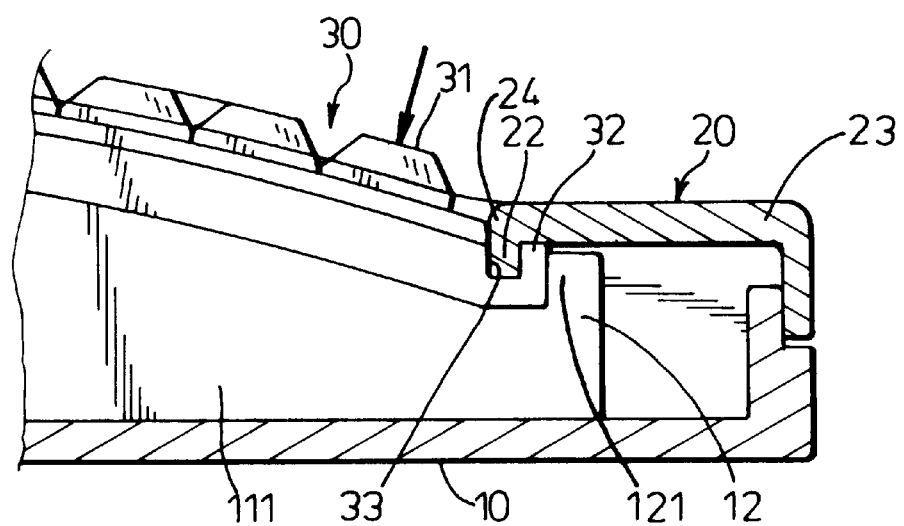
FIG. 7 is an enlarged fragmentary sectional view of the embodiment of FIG. 4.

The substrate 316 further has a pair of grooves 33 extending in two opposing ends 32 of the substrate 316 along directions substantially parallel to the top flanges 121. As shown in FIG. 7, the hollow frame 23 of the cover 20 has two opposing inner edges 24 that bound the opening 21. The inner edges 24 have downwardly projecting tabs 22 to engage the grooves 33 and to press downward the opposing ends 32 of the substrate 316, respectively.

Figure 8:
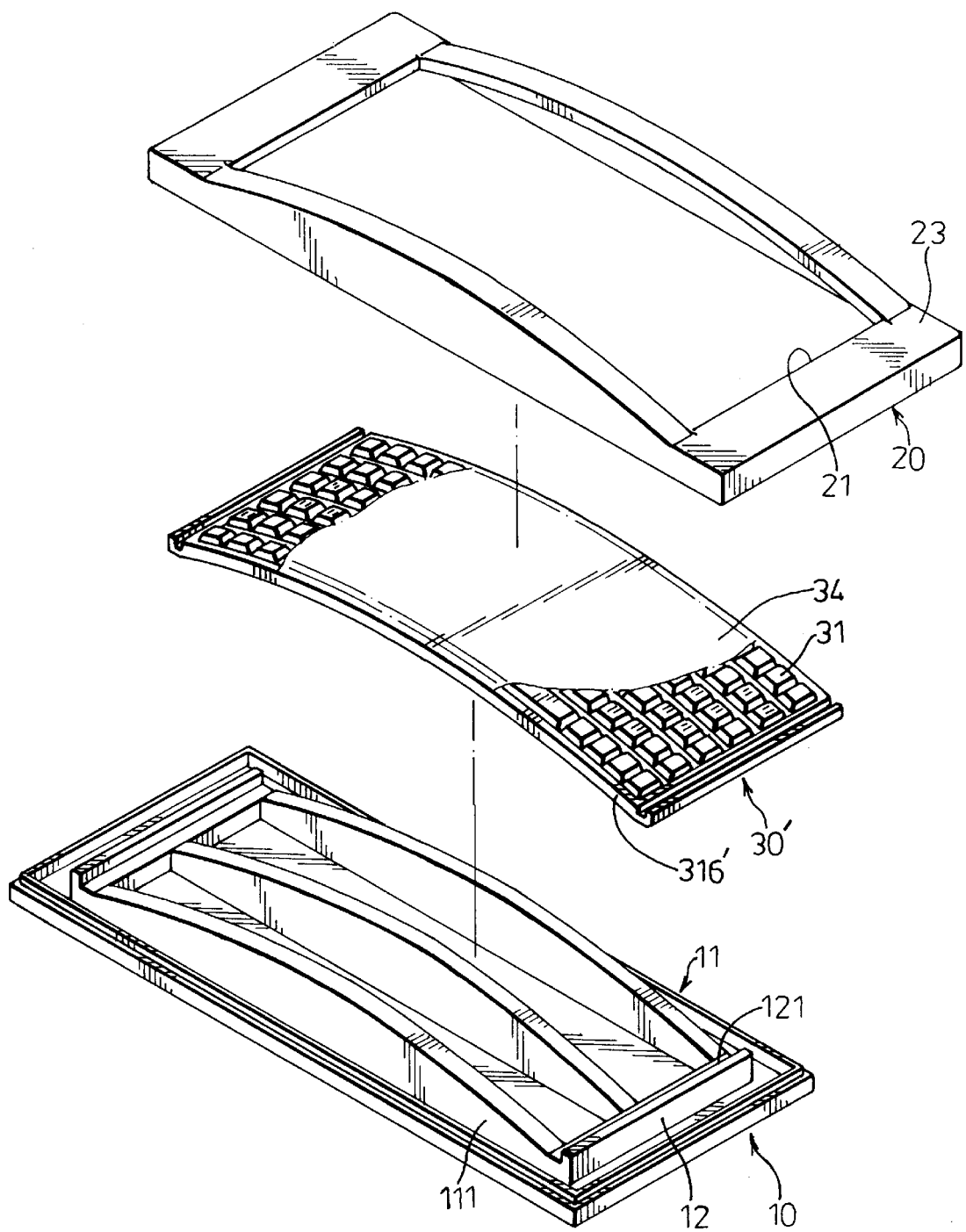
FIG. 8 is an exploded perspective view showing the second preferred embodiment of an ergonomical keyboard assembly according to this invention.

Referring to FIG. 8, the second preferred embodiment of the invention differs from the first preferred embodiment in that a keyboard 30' has a substrate 316' which is originally curved before mounting on the base plate 10. With the originally curved substrate 316', the keyboard 30' can be flexed on the support strips 111 more easily with a greater degree of curvature, in comparison with the keyboard 30 of the first embodiment.

Figure 9:
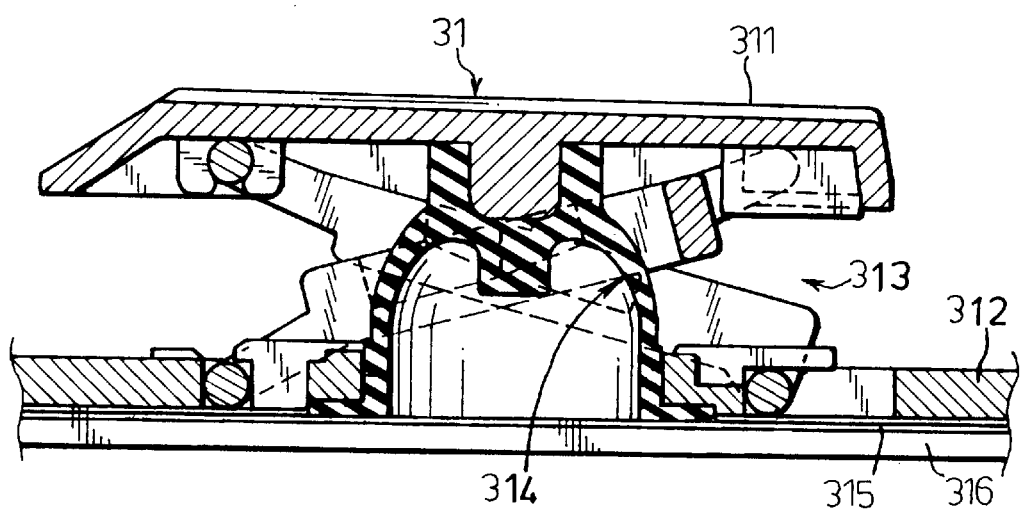
FIG. 9 is a fragmentary sectional view showing a key of the first and second preferred embodiments.

FIG. 9 shows the construction of one of the keys 31 mounted on the substrate 316 of the keyboard 30 in the first embodiment. A membrane circuit board 315 and a bridge plate 312 are mounted on the top face of the substrate 316. The substrate 316 is a flexible metal plate, and the bridge plate 312 is made of a flexible plastic material. Therefore, the entire structure of the keyboard 30 is flexible. The keys 31 are mounted on the substrate 316 via a conventional manner. Each key 31 has the key cap 311, a bridge 313 supporting movably the key cap 311, and a biasing member 314.

As described hereinabove, the keys 31 are arranged on an arched face of the substrate 316 or 316' so that the overall key surface 34 of the keyboard 30 or 30' is arched and protrudes upward from the cover 20. The arched overall key surface 34 of the keys 31 permits the hands of the user to operate the keys 31 with the palms thereof facing inward as they do in a natural physical position. In addition, the fingers of the user may apply their key striking forces to the arched key surface 34 along the directions corresponding to the natural positions of the fingers. Therefore, the keyboard assembly according to the present invention is ergonomically superior and can minimize the problems of fatigue or injury to the user as compared to the prior art.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An ergonomical keyboard assembly, comprising:

an upper cover including a hollow frame, and an opening confined by said frame, said opening having opposite ends and an intermediate portion;

a lower base plate connected to said cover; and a keyboard having a substrate mounted on said base plate below said cover, and a plurality of keys mounted on said substrate having key caps projecting upward and outward from said cover through said opening, said substrate having a top face which is arched and which protrudes upward, said key caps forming an arched overall key surface that projects upward and outward through said opening and that is arched upward from said opposite ends of said opening to said intermediate portion, said substrate comprising a flexible plate forming said arched top face, said base plate including a support to hold said substrate, said support having an arched surface and including a plurality of support strips which extend lengthwise and which project upward from said base plate, said support strips having arched top ends.

2. The ergonomical keyboard assembly as claimed in claim 1, wherein said arched overall key surface is symmetric at two sides of said intermediate portion.

3. The ergonomical keyboard assembly as claimed in claim 1, wherein said base plate further includes engaging means associated with said support strips for engaging two opposing ends of said substrate.

4. The ergonomical keyboard assembly as claimed in claim 3, wherein said engaging means includes a pair of engaging strips which project upward from said base plate transversely of said support strips, said engaging strips having upwardly projecting stop flanges to engage and press said opposing ends of said substrate in two opposing directions toward one another.

5. The ergonomical keyboard assembly as claimed in claim 4, wherein said substrate further has a pair of grooves extending in said opposing ends of said substrate along directions substantially parallel to said stop flanges, said hollow frame of said cover having two opposing inner edges that bound said opposite ends of said opening, said inner edges having downwardly projecting tabs to engage said grooves and to press downward said opposing ends of said substrate, respectively.

* * * * *